United States Patent [19]

Luthman et al.

[11] 3,769,847
[45] Nov. 6, 1973

[54] BREAKAWAY MECHANICAL LINKAGE

[75] Inventors: Paul A. Luthman, Maria Stein; Thomas R. Fischer, Wapakoneta, both of Ohio

[73] Assignee: Avco Corporation, Coldwater, Ohio

[22] Filed: Apr. 7, 1972

[21] Appl. No.: 242,151

Related U.S. Application Data

[63] Continuation-in-part of Ser. No. 145,443, May 20, 1971, abandoned.

[52] U.S. Cl. .................................... 74/118, 64/29
[51] Int. Cl. .......................................... F16h 29/00
[58] Field of Search ................... 74/118, 125, 575, 74/125.5, 116; 214/44 B; 64/29

[56] References Cited
UNITED STATES PATENTS

| | | | |
|---|---|---|---|
| 2,291,407 | 7/1942 | Paul | 64/29 |
| 3,127,778 | 4/1964 | Kock | 74/116 |
| 461,813 | 10/1891 | Cahow | 64/29 |
| 684,018 | 10/1901 | Wellman | 64/29 |
| 842,172 | 1/1907 | Camp | 74/118 |
| 1,289,977 | 12/1918 | Walker | 64/29 |
| 928,025 | 7/1909 | Buswell et al. | 74/118 |
| 3,156,124 | 11/1964 | Miller | 74/116 |

FOREIGN PATENTS OR APPLICATIONS

| | | | |
|---|---|---|---|
| 121,409 | 12/1918 | Great Britain | 64/29 |
| 442,042 | 1/1936 | Great Britain | 64/29 |

*Primary Examiner*—Charles J. Myhre
*Assistant Examiner*—Wesley S. Ratliff, Jr.
*Attorney*—Charles M. Hogan et al.

[57] ABSTRACT

A breakaway mechanical linkage is comprised of a pair of overlapping elongated elements having opposed ratchet faces on their overlapping portions. The ratchet faces have a first set of ramps of a relatively steep slope and a second set of ramps having a much shallower slope. A number of springs hold the interfitting ratchet faces together at a normal operating length. A given longitudinal force causes the first set of ramps to ride up one another and permit the elements to displace to a different total length. A longitudinal spring brings the elements back to their original position so that the linkage may be reset. This linkage is advantageously used in the conveyor drive mechanism of a manure spreader.

17 Claims, 3 Drawing Figures

BREAKAWAY MECHANICAL LINKAGE

This application is continuation-in-part of S. N. 145,443, filed May 20, 1971, now abandoned.

The present invention relates to mechanical linkages and more specifically to linkages that break away when normal operating force levels are exceeded.

There are many applications for breakaway mechanical linkages. One of the most needed is in the drive mechanism for a manure spreader. Generally, a linkage is connected to an input crank pin and to a pivotal arm which drives a conveyor mechanism. The conveyor mechanism moves manure to the aft end of the spreader for discharge onto the ground. In practice, many farmers leave a manure spreader out overnight in freezing weather. This causes the conveyor to freeze to the bottom. When the spreader is to be operated the next day, a serious overload condition is placed on the conveyor drive mechanism for the manure spreader. In the past this condition has been alleviated by a breakaway crank arm using shear pins. While this is generally effective, there is always the problem of extracting the shear pin and installing a new one to permit continued operation. In addition, the shear pin normally is designed to shear at a level substantially over the normal operating load, due to manufacturing tolerances, so that much higher force levels than normally expected will be experienced with this type of device before it renders the crank arm inoperative.

One approach to a resettable crank arm is that found in the patent to Koch, No. 3,127,778. The device disclosed in this patent enables a resettable collapsible link. However, it does have a problem of being accommodated in the rather narrow existing confines of manure spreader mechanisms.

Therefore it is an object of the present invention to provide a highly simplified, effective, compact and economical breakaway mechanical linkage.

These ends are achieved by a breakaway mechanical linkage comprising elongated first and second elements overlapping one another and means for forming opposed interfitting ratchet faces on the first and second elements. The ratchet faces have a first set of ramps of predetermined relatively steep slopes positioned so that the first set of ramps abut one another. The opposed ratchet faces are yieldably urged against one another with a predetermined force generally lateral to the longitudinal axis of the linkage. The first set of ramps slide up one another against the yieldable urging means when a predetermined longitudinal force is exceeded in the mechanical linkage, thereby permitting the elements to displace relative to one another.

Figure 1:
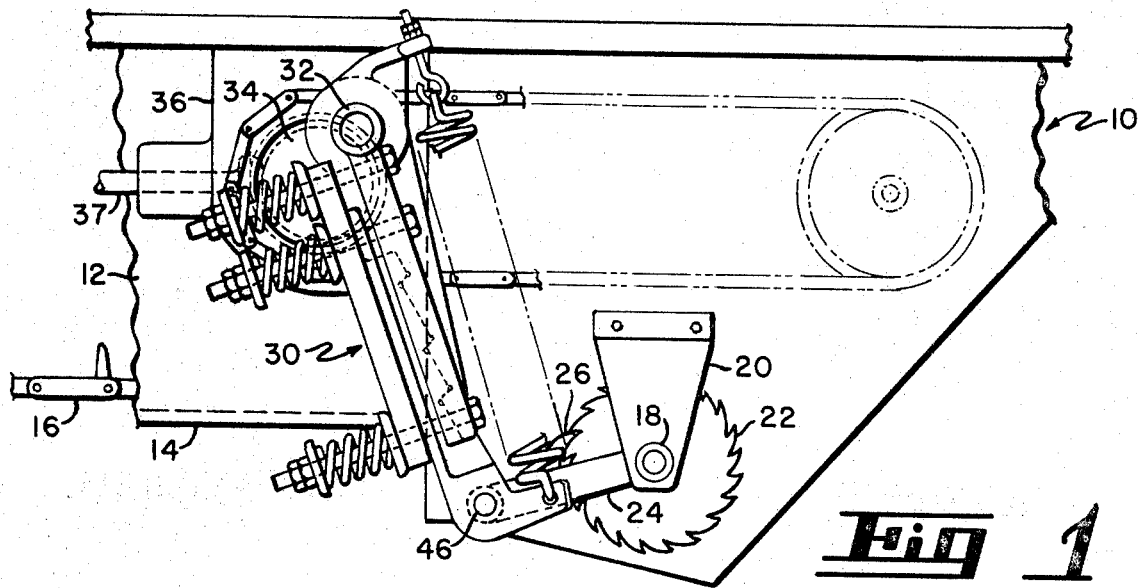
FIG. 1 is a fragmentary simplified view of a manure spreader with which the mechanical linkage embodying the present invention may be used.

Referring to FIG. 1 there is shown a manure spreader, generally indicated by reference character 10, with which the invention may be used. While the use of the mechanical breakaway linkage embodying the present invention will be illustrated in connection with this manure spreader, it should be apparent to those skilled in the art that it may be used with equal success in other applications.

The manure spreader 10 comprises an open-ended box having sides 12 and a floor 14 upon which a load of manure is placed. The manure is conveyed to a distributing mechanism (not shown) aft of the side walls 12 by a chain-type conveyor assembly 16. This chain-type conveyor comprises a pair of chains each trained over drive sprockets (not shown) mounted on a drive shaft 18 journaled in a support 20. A ratchet wheel 22 is secured also to shaft 18. An arm 24 is pivotally journaled on the same axis as shaft 18 and has a ratchet pawl 26 adapted to engage the ratchet teeth of ratchet wheel 22 for clockwise pivoting of arm 24. Thus, as arm 24 oscillates through a given arc its clockwise displacement causes the ratchet wheel 22 to rotate in a clockwise direction, thus conveying the manure to the aft end of the spreader.

The arm 24 is reciprocated by a breakaway mechanical linkage 30 secured to arm 24 and to a crank pin 32 of a drive wheel 34. Drive wheel 34 receives a constant clockwise rotation from a suitable source, such as a tractor PTO by a shaft system 37 extending to right angle gear box 36.

Figure 2:
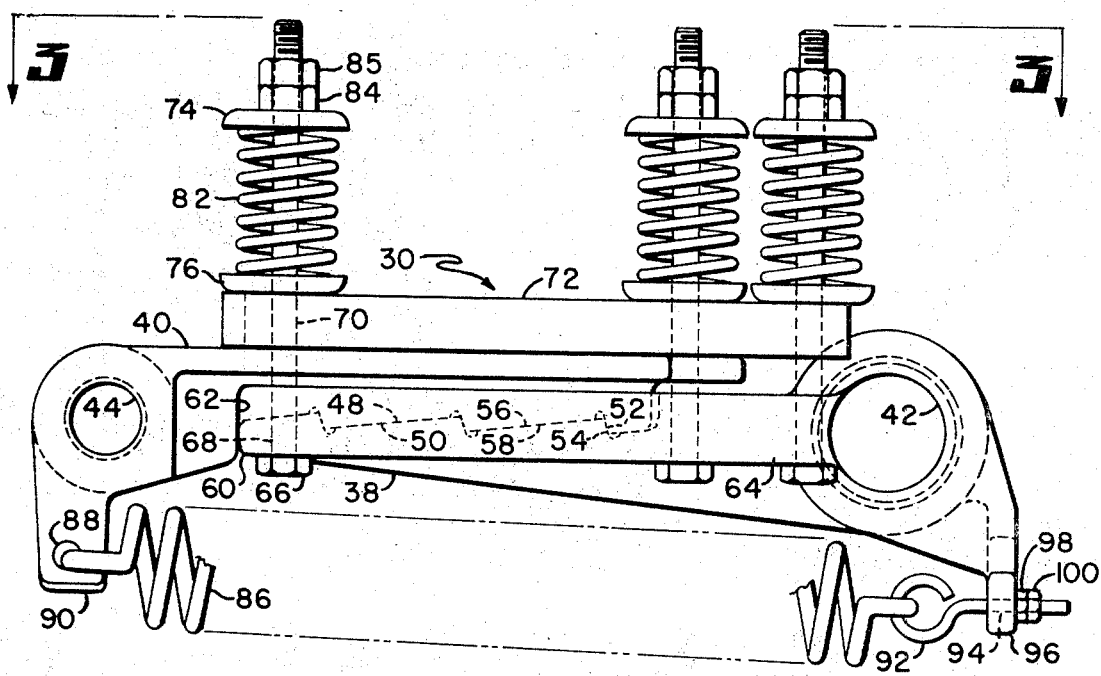
FIG. 2 is a side view of a breakaway mechanical linkage embodying the present invention.
Figure 3:
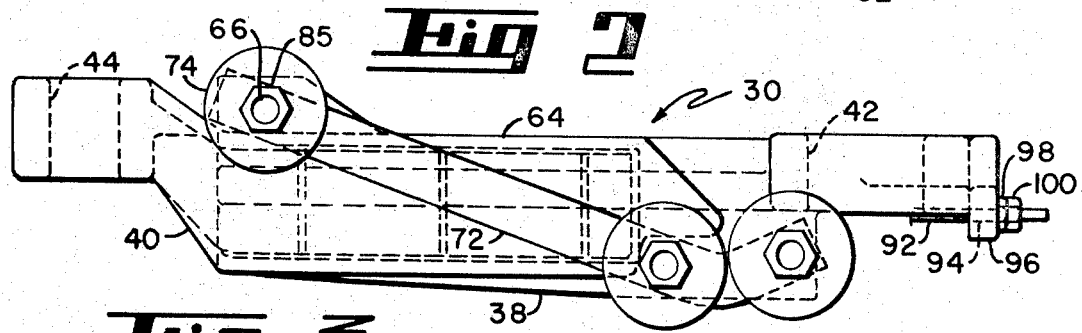
FIG. 3 is a view taken on line 3—3 of FIG. 2.

Referring to FIGS. 2 and 3 the linkage 30 comprises first and second elongated elements 38 and 40 overlapping one another. Element 38 has an integral end sleeve 42 for connection with crank pin 32. Element 40 has a similar end sleeve 44 for connecting with a pin 46 on arm 24. Ratchet faces 48 and 50 are formed, respectively, on the overlapping portions of elements 38 and 40. These ratchet faces comprise a first set of ramps 52, 54, respectively, having a relatively steep, predetermined slope. Ramps 52 and 54 are positioned relative to the direction of normal force input to the linkage, i.e, tension or compression so that they are urged into abutment by this normal force input. As herein shown, the normal force input is a tension force so that the sets of ramps 52 and 54 abut one another when the linkage is essentially urged apart by a tension force. The ratchet faces 48 and 50 also contain second sets of ramps 56 and 58, respectively, in between the first set of ramps 52 and 54. These ramps have a predetermined relatively shallow slope relative to the slope of ramps 52 and 54.

The end face 60 of element 38 abuts an end wall 62 of element 40 to limit the movement of ramps 52 and 54 away from one another in a direction tending to reduce the total length of the linkage. Integral longitudinal flanges 64 on opposite sides of element 38 guide the elements 38 and 40 for longitudinal relative movement only.

A series of bolts 66 extend through holes 68 in element 38 and through holes 70, a connecting bar 72 overlying the opposite side element 40. A pair of cups 74, 76 and a spring 82 are telescoped over the bolt assembly 66 so that cup 76 abuts the connecting bar 72 and the other cup 74 abuts an adjusting nut 84 threaded onto bolt 66. A lock nut 85 insures that the position of adjusting nut 84 will be maintained. Spring 82 acts on cups 74, 76 so that the ratchet faces 48 and 50 are yieldably urged together in a direction normal to the longitudinal axes of the linkage.

A spring 86 extending generally parallel to the longitudinal axis of the linkage hooks at one end through a hole 88 in a tab 90 extending from the sleeve 44 on element 40. At the other end the spring 86 hooks onto an eye-bolt 92 extending through an opening 94 in a web 96 integral with the sleeve 42 of element 38. An adjusting nut 98 is threaded onto eye-bolt 92 and a lock nut 100 maintains the position of the adjusting nut 98.

During normal operation of the linkage of FIGS. 2 and 3, such as in the manure spreader 10, the linkage is maintained in the position shown in FIGS. 2 and 3 in which it has a given normal length and the ramps 52 and 54 abut one another. The linkage is subjected to rather substantial tension forces when it is used to reciprocate the arm 24 to drive the conveyor assembly 16. The linkage is held in this reduced length position by the inter-engagement of the ramps 52 and 54. Any tendency for longitudinal forces to pull the elements 40 and 38 apart is resisted by the springs 82, since the ramps 52 and 54 must ride up one another to expand the linkage.

The height of the springs 82 is adjusted by the adjusting nut 84 so that the ratchet faces 48 and 50 are urged together with a predetermined force. This force is selected so that the ramps 52 and 54 will only ride up one another when a predetermined maximum longitudinal force is exceeded. Since in this case the linkage is used to pull the crank arm 24, this would be a predetermined tension force.

Wne this predetermined force is exceeded and the ramps 52 and 54 ride up one another, they mutually reach the junction between the shallow and steep ramp sets so that viewing FIG. 2 the shallow ramps 56 and 58 are free to slide down one another until the ramps 52 and 54 reach the next ramp. The length of the shallow ramps are selected to permit a complete rotation of drive wheel 34 without reciprocating arm 24. Thus, when this predetermined force is exceeded the elements 38 and 40 expand to a total length that does not cause link 24 to be reciprocated.

As the drive wheel 34 rotates to a position where the linkage is urged to its initial length, the spring 86 pulls the elements together so that the shallow ramps 56 and 58 slide up one another to again set the ramps 52 and 54 in their initial position. Since ramps 56 and 58 are substantially shallower than ramps 52 and 54, the amount of force required to pull the linkage together to its original position is far less than the force needed to pull it apart. The end face 60 and the wall 62 of the elements limits any further movement of the linkages to a reduced position. The tension of the spring 86 is adjusted so that an appropriate resetting force is applied to the elements to reset them to their initial position.

It should be apparent that as long as the predetermined force is exceeded in the linkage, such as when the conveyor mechanism is clogged, the linkage will continue to expand and to contract indefinitely until the condition is removed. The substantial face area of the ratchet faces insures that wear of the surface during this condition will be minimal. It should also be noted that linkage in effect functions as a force limiter in this situation so that for each expansion cycle of the linkage a predetermined force is exerted on the ratchet wheel 22. Thus during this condition a cyclical force is applied to the conveyor mechanism which in some cases tends to break frozen manure loose and permit operation of the spreader.

It should also be noted that the present invention, when applied to a manure spreader, totally eliminates the need for a farmer to replace shear pins and to gain access to the mechanism of the spreader under these conditions. This greatly assists an efficient operation of the spreader and significantly improves safety since it minimizes exposure to the working mechanism of the unit.

The mechanism linkage of the present invention has been described in connection with a manure spreader drive mechanism. It should be apparent that it may be employed in any one of a wide number of applications where it is desirable to limit the maximum force transmitted through a linkage.

While the preferred embodiment of the present invention has been described, it should be apparent to those skilled in the art that other embodiments may be employed by those skilled in the art without departing from the spirit and scope of the present ivention.

Having thus described the invention, what is claimed as novel and desired to be secured by Letters Patent of the United States is:

1. A resettable breakaway mechanical linkage for transmitting linear reciprocating movement, said linkage comprising:

an elongated linearly extending first element;

an elongated linearly extending second element adjacent to and overlapping said first element;

means for forming opposed interfitting ratchet faces on said first and second elements, said ratchet faces having a first set of ramps of a predetermined, relatively steep slope positioned so that the first set of ramps abut one another and position the elements at a normal total linkage length and a second set of ramps in between the first set of ramps;

means for yieldably urging said opposed ratchet faces against one another with a predetermined force lateral to the longitudinal axis of said linkage so that said first set of ramps slide up one another against the yieldable urging means when a predetermined longitudinal force is exceeded in said mechanical linkage, thereby permitting said elements to displace relative to one another and produce a different total linkage length;

abutment means for limiting relative displacement of said elements from said normal linkage length in a direction opposite to the direction of movement in response to said predetermined longitudinal force; and means for yieldably longitudinally urging said input and output elements relative to one another to said normal linkage length against said abutment means.

2. A breakaway mechanical linkage as in claim 1 wherein said second set of ramps has a slope substantially less than that for the first set of ramps whereby the force required to reset said elements is substantially less than the force required to initially displace them relative to one another.

3. A breakaway mechanical linkage as in claim 1 wherein said ratchet face means comprises ratchet faces integrally formed on the opposing overlapping faces of said first and second elements.

4. A breakaway mechanical linkage as in claim 1 wherein said longitudinal yieldable urging means comprises a spring secured to the remote ends of said first and second elements.

5. A breakaway mechanical linkage as in claim 4 wherein said means for yieldably urging said opposed ratchet faces against one another lateral to the longitudinal axis of said linkage comprises:

a plurality of bolts extending from one of said elements across the opposed ratchet faces of said elements and to the opposite side of the adjacent element;

a connecting bar telescoped over said bolts and abutting the opposite face of said adjacent element;

springs acting on said connecting bar and the end of said bolts for urging said ratchet faces together.

6. A breakaway mechanical linkage as in claim 5 wherein the point of abutment of said springs on the end of said bolts is adjustable, whereby the predetermined longitudinal force at which said elements displace relative to one another may be adjustably selected.

7. A breakaway mechanical linkage as in claim 6 wherein one of said elements has longitudinally extending flanges bracketing the other of said elements and forming a longitudinal guide therefor.

8. A breakaway mechanical linkage as in claim 7 adapted to receive a reciprocating linear input that places said linkage in tension and wherein said first sets of ramps are positioned to ride up one other set of ramps for a tension force.

9. In a drive unit for a conveyor of a manure spreader having a rotatable conveyor drive member including a ratchet wheel and a pivotal arm adapted to engage successive circumferential teeth of said ratchet wheel to rotate said ratchet wheel in response to linear reciprocable movement of said arm and a rotatable crank pin having a constant rotary motion, a breakaway crank arm interconnecting said crank pin and said arm, said breakaway crank arm comprising:

a first linear elongated element connected to said crank pin;

a second linear elongated element connected to said pivotal arm and adjacent to and overlapping said first element;

means for forming opposed interfitting ratchet faces on the opposed faces of said first and second elements, said ratchet faces having a first set of ramps of a predetermined relatively steep slope positioned so that the first set of ramps abut one another and position the elements at a normal total linkage length;

means for yieldably urging said opposed ratchet faces against one another with a predetermined force so that said first set of ramps slide up one another against the yieldable urging means when a predetermined longitudinal tension force is exceeded in said crank arm, thereby permitting said elements to linearly displace relative to one another and permitting said input member to rotate without producing a rotary input in said ratchet wheel.

10. Apparatus as in claim 9 wherein:

said ratchet-forming means further comprises a second set of ramps in between said first set of ramps; said apparatus further comprises:

abutment means for limiting relative displacement of said elements from said normal linkage length in a direction opposite to the direction of movement in response to said predetermined longitudinal force; and means for yieldably urging said elements in a longitudinal direction against said abutment means, whereby said crank arm is reset for each rotation of said crank pin.

11. Apparatus as in claim 10 wherein said second set of ramps has a shallow slope relative to said first set of ramps whereby a substantially greater force is required to expand the total length of said crank arm relative to the force necessary to contract it to normal linkage length.

12. Apparatus as in claim 9 wherein said ratchet-forming means comprises ratchet faces integrally formed with the opposed faces of said first and second elements.

13. Apparatus as in claim 12 wherein:

said ratchet-forming means further comprises a second set of ramps in between said first set of ramps having a substantially shallower slope;

said apparatus further comprises:

abutment means for limiting relative displacement of said elements from said normal linkage length in a direction opposite to the direction of movement in response to said predetermined longitudinal force; and a longitudinal yieldable urging means acting to displace said first and second elements against said abutment means.

14. Apparatus as in claim 13 wherein said longitudinal yieldable urging means comprises a spring attached to the remote ends of said first and second elements and acting to urge them toward a reduced total length.

15. Apparatus as in claim 14 wherein said means for yieldably urging said opposed ratchet faces against one another comprises:

bolts extending from one element across the opposed ratchet face to the opposite side of the adjacent element;

a connecting bar telescoped over said bolts and abutting the opposite face of said adjacent element;

abutment means on the end of said bolts on the opposite side of said adjacent element; and springs abutting the connecting bar and said abutment means thereby urging said ratchet faces into engagement.

16. Apparatus as in claim 15 wherein said abutment means is yieldably adjustable on said bolt whereby the force at which said crank arm expands is adjustable.

17. Apparatus as in claim 16 wherein one of said elements has longitudinally extending flanges bracketing the other of said elements and thereby forming a longitudinal guide for it.

* * * * *